United States Patent Office 3,336,198
Patented Aug. 15, 1967

3,336,198
AMINOMETHYL DERIVATIVES OF RUTIN AND PROCESS FOR THE MANUFACTURE THEREOF
Johannes Mueller, Arlesheim, and Enrico Ménard, Basel, Switzerland, assignors to Ciba Corporation, New York, N.Y., a corporation of Delaware
No Drawing. Filed Jan. 27, 1965, Ser. No. 428,550
Claims priority, application Switzerland, Feb. 14, 1964, 1,793/64; Apr. 15, 1964, 4,819/64; Dec. 29, 1964, 16,794/64
20 Claims. (Cl. 167—65)

The present invention provides a new process for the aminomethylation of rutin of the formula I
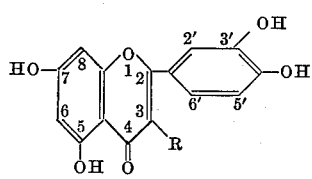

where R represents the rutinosyloxy radical (=rutinosido radical).

It has already been proposed to aminomethylate polyoxyflavones to render them water-soluble (see Swiss Patent No. 348,710). However, this known process is performed at a steam bath temperature and from the said Swiss patent it is clear that such a temperature is needed for the reaction. Thus, the patent mentioned recommends the use of an aqueous medium or, if the boiling point of the amino compound is not too low, of an excess of amine, for example morpholine boiling between 126 and 130° C.

The present invention is based on the observation that the said known process gives rise to a complex mixture of higher polymerized aminomethyl-polyoxyflavones from which no unitary compounds can be isolated by preparative methods. The manufacture of unitary, monomeric or at most dimeric aminomethyl compounds of the aforementioned flavonols therefore remained a problem for which no industrial resolution had been found although the manufacture of such unitary compounds was certainly most desirable for readily understood reasons in view of a possible use of the compounds as a medicament.

It has now been found that the formation of complex mixtures according to the process disclosed in Swiss Patent No. 348,710 is due to the fact that the process is performed at a temperature at which all reactive positions of the molecule that are suitable for nuclear substitution enter the reaction to give rise to methylene bridges leading to higher polymeric aminomethyl compounds.

In contradistinction thereto it has now been found that when rutin of the Formula I is used and the aminomethylation is conducted at a temperature not exceeding about 60° C., aminomethylation takes place substantially at most in two positions, namely in positions 6 and 8, whereas, for example, position 5' does not react and the resulting compounds are substantially at most dimeric. In this new process the predominant formation of one or other of these compounds can be flavoured by suitably selecting the solvent and the reaction temperature. In this manner it has become possible to obtain reaction products from which the individual compounds can be manufactured industrially in the purified form.

It was observed, for example, that under anhydrous conditions, for example in a tertiary amine, such as pyridine, triethylamine, quinoline or a similar base, or for example dimethylsulfoxide as diluent, and at a low temperature and with the use of approximately equimolecular proportions of formaldehyde predominantly 8-aminomethyl compounds are formed. When strong Mannich bases, for example dimethylamine, are used, the preferred temperature range is from about −20 to 25° C., when weak Mannich bases, for example morpoline, are used, from about 25 to 60° C.

When the reaction is carried out in an aqueous medium, for example in an aqueous alcohol, such as aqueous ethanol, aqueous pyridine, triethylamine, or in plain water, and with the use of approximately 2 mols of formaldehyde, and at a low temperature, advantageously at about 0 to 25° C., the main product obtained is the 6:8-diaminomethyl product.

On the other hand, when in the above-mentioned modifications of the process, more especially the last-mentioned, the temperature is raised, advantageouly to over 25° C., for example to about 40 to 60° C., dimerization takes place and yields predominantly compounds in which the 6- or 8-position of one molecule is linked with the 8-position of the other molecule by a methylene group, and the position 8 or 6 of the first molecule, or additionally the position 6 of the second molecule, is aminomethylated.

It has also been found that when the starting materials are used in the form of their dimetal phenolates under anhydrous reaction conditions and at a lower temperature, for example −25 to 25° C., selective aminomethylation takes place in the 6-position. The dialkali metal phenolates used are advantageously as dimetal phenolates. It is of advantage not to isolate the metal-phenolates, but to work in the presence of advantageously about 2 mol of an agent yielding them, such, for example, as an alkali, preferably an alkali metal hyrdoxide. In order to create anhydrous conditions it is advantageous to use the above-mentioned solvents. It is not necessary in this case to keep to approximate stoichiometric quantities of the formaldehyde in view of the blocking of the 8-position.

In this manner, starting for instance from rutin, formaldehyde and dimethylamine, the following products are obtained:

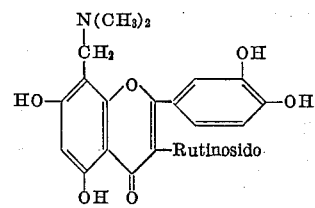

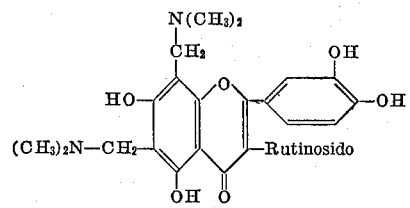

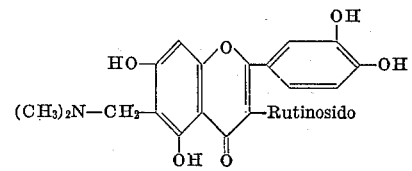

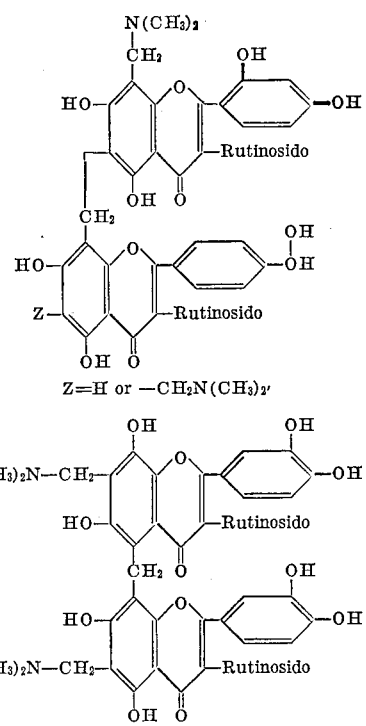

Z=H or —CH₂N(CH₃)₂′

Accordingly, the present invention provides a process in which rutin of the formula

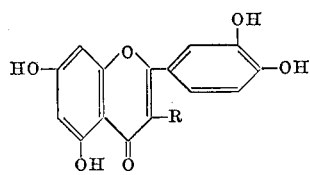

where R represents the rutinosyloxy radical—if desired in the form of a dimetal phenolate—is reacted at a temperature not exceeding about 60° C. with a secondary amine H—X and formaldehyde and, if desired, the aminomethyl compounds so formed are individually isolated in the pure form and, if desired, a resulting salt is converted into the free compound or a free compound is converted into one of its salts.

The reaction with formaldehyde and the secondary amine H—X is performed as a Mannich reaction, advantageously with the use of a small excess of formaldehyde beyond the stoichiometric proportion. Thus, formaldehyde may be replaced by a formaldehyde donor, for example trihydroxymethylene or paraformaldehyde or formaldehyde acetals, if desired with the addition of an acid. The amine may be used in excess of the formaldehyde to accelerate the reaction and/or in the form of a salt. Advantageously it is used in the free form. The reaction is preferably conducted in a diluent such as water or in an organic solvent such, for example, as one of those mentioned above, or a mixture thereof. When a polymer of formaldehyde is used, it is advantageous to perform the reaction in an organic diluent, such as one of those mentioned above. If desired, the reaction is carried out under superatmospheric pressure. To prevent any loss by oxidation the reaction may be carried out under an inert gas, for example under nitrogen.

The isolation of the pure end products may be carried out in various ways. The monomeric monoamines may, as a rule, be precipitated, for example from the anhydrous reaction medium by the addition of weakly polar or non-polar organic solvents such as ether, ethanol or acetone, and crystallized from an acidic aqueous solution by neutralisation, for example with sodium hydroxide solution. From neutral aqueous solution the monomeric mono- and diamines may be precipitated by the addition of weakly polar organic solvents such as alcohol whereupon they may be crystallized as indicated above. The dimeric monoamines behave in a similar way to their monomers, whilst the 6,8-dimeric diamines may surprisingly be precipitated selectively in pure form very readily from a dilute, neutral aqueous solution by the addition of an alcohol, such as ethanol, isopropanol, propanol or n-butanol or secondary butanol, and what is more in a low concentration.

Substituents suitable for the secondary amine H—X are above all lower aliphatic hydrocarbon radicals whose carbon chain may be interrupted by hetero atoms such as oxygen, sulfur or nitrogen and/or which may be substituted by free hydroxyl groups or halogen atoms.

Lower aliphatic hydrocarbon radicals are above all saturated or mono-unsaturated alkyl, cycloalkyl or cycloalkyl-alkyl radicals containing up to 8 carbon atoms. Radicals of this kind which are interrupted by hetero atoms are above all oxa- or aza-alkyl, oxaalkylene, aza-alkylene or oxacycloalkyl-alkyl radicals, more especially methyl, ethyl, allyl, propyl or isopropyl; or straight or branched butyl, pentyl, hexyl or heptyl radicals linked in any desired position;

3-oxabutyl,
3-oxapentyl,
3-oxaheptyl,
2-hydroxyethyl,
3-hydroxypropyl,
butylene-(1,4),
pentylene-(1,5),
hexylene-(1,5),
hexylene-(1,6),
hexylene-(2,5),
heptylene-(1,7),
heptylene-(2,7),
heptylene-(2.6),
3-oxa-pentylene-(1,5),
3-aza-pentylene-(1,5),
3-lower alkyl-3-aza-pentylene-(1,5),
such as 3-methyl-3-aza-pentylene-(1,5),
3-hydroxy-lower alkyl-3-pentylene-(1,5),
such as 3-hydroxyethyl-3-aza-pentylene-(1,5),
3-oxa-or 3-aza-hexylene-(1,6);
cyclopentyl-, cyclohexyl-, cyclopentenyl-, cyclohexenylmethyl or -ethyl radicals.

The secondary amine H—X is above all a di-lower alkylamine, more especially dimethylamine or diethylamine, or a pyrrolidine, piperidine, morpholine, piperazine or N-methyl-, N-ethyl- or N-β-hydroxyethyl-piperazine.

Alkyl radicals referred to above and hereinafter may be, especially those which contain up to 8 carbon atoms, above all, for example, the alkyl radicals mentioned above.

The resulting reaction products, more especially the individual aminomethylation products in the pure form, thus above all the compounds of the formula II
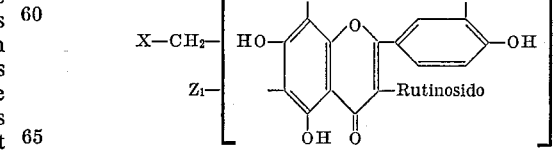

where Z₁ represents hydrogen or —CH₂X or a radical of the formula

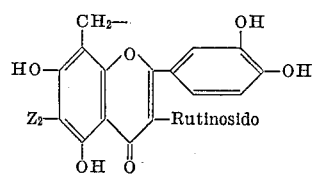

[where $Z_2$ is hydrogen or —$CH_2X$ and X has the above meaning]—are new and likewise form an object of the invention.

As indicated above, the radical X in these new compounds has primarily the above meanings.

The reaction products, especially the specifically shown new compounds, have anti-inflammatory properties. Inter alia, they inhibit the increased capillary permeability caused by polypeptides and the dextrane oedema in the rat paw. They may therefore be used as anti-inflammatory medicaments, inter alia, to treat a disturbed venous circulation. They are also valuable intermediates for the manufacture of further substances suitable for medicinal use.

Of special value are the compounds of the formulae

III 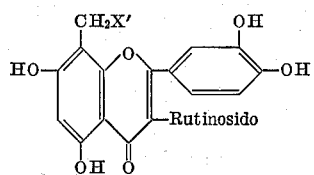

IV 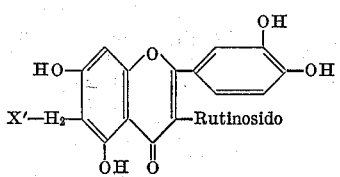

V 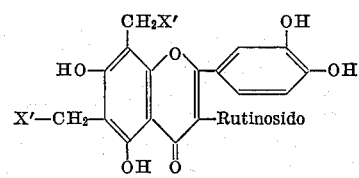

VI 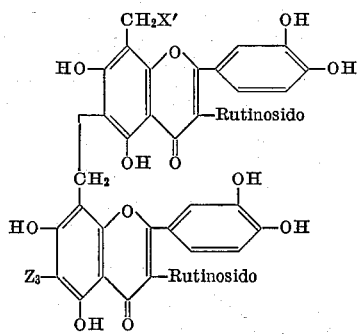

VII 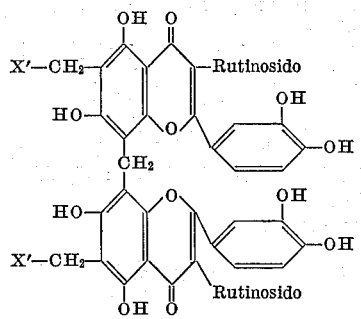

where $Z_3$ represents hydrogen or —$CH_2$—X' and the radicals X' are lower dialkylamino groups or pyrrolidino, piperidino, morpholino, piperazino or N-methyl-, N-ethyl- or N-β-hydroxyethyl-piperazino groups as well as their artificially produced mixtures.

In this group of compounds there are particularly distinguished by their good pharmacological properties 3-rutinosido - 5,7,3',4' - tetrahydroxy - 8 - dimethylaminomethyl-flavonol of the formula VIII 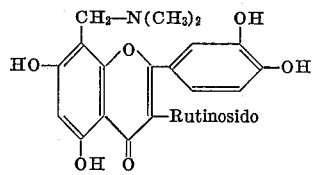

3-rutinosido - 5:7:3':4' - tetrahydroxy - 6 - dimethylaminomethyl-flavonol of the Formula IX IX 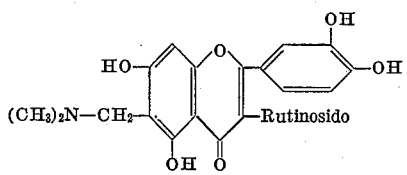

and 3-rutinosido-5,7,3',4'-tetrahydroxy-6,8-bis-(dimethylaminomethyl)-flavonol of the Formula X X 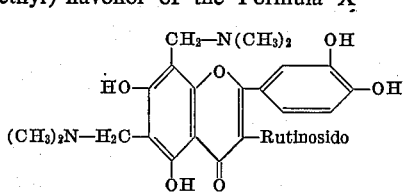

and 3-rutinosido-5,7,3',4'-tetrahydroxy-6 - [3'''-rutinosido-5''',7''',3''',4''' - tetrahydroxy-flavonol - (8'') - yl - methyl]-8-dimethylaminomethyl-flavonol of the formula XI 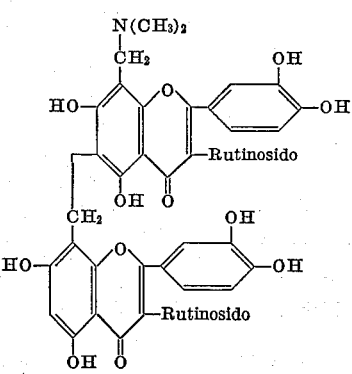

and 3 - rutinosido-5,7,3',4'-tetrahydroxy-6-dimethylaminomethyl - 8 - [3'' - rutinosido - 5'',7'',3''',4''' - tetrahydroxy-6'' - dimethylaminomethyl - flavonol - (8'') - yl - methyl]-flavonol of Formula XII XII 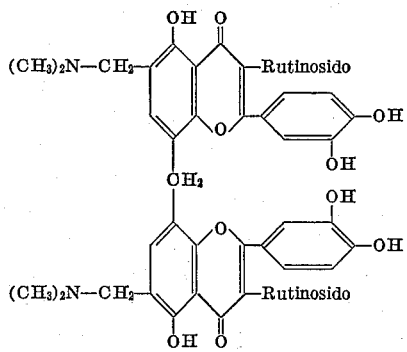

and above all the 3-rutinosido-5,7,3',4'-tetrahydroxy-6-[3''' - rutinosido - 5'',7'',3''',4''' - tetrahydroxy - 6'' - dimethylaminomethyl-flavonol-(8")-yl-methyl]-8-dimethylaminomethyl-flavonol of the formula

XIII

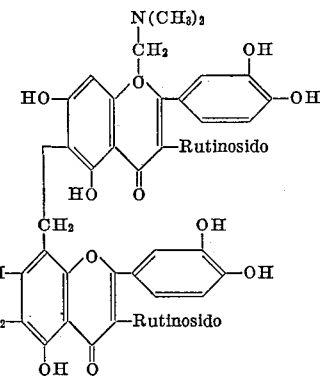

and artificially produced mixtures of these compounds.

The present process is, therefore, preferably performed with the use of starting materials and reaction conditions that yield the advantageous final products referred to above.

Depending on the reaction conditions employed the new compounds are obtained in the free form or in the form of their salts. With the aid of acids, for example therapeutically useful salts can be formed, for example salts of hydrohalic, sulfuric, phosphoric acids, nitric or perchloric acid; aliphatic, alicyclic, aromatic or heterocyclic carboxylic or sulfonic acids, such as formic, acetic, propionic, oxalic, succinic, glycollic, lactic, malic, tartaric, citric, ascorbic, hydroxymaleic, dihydroxymaleic or pyruvic acid; phenylacetic, benzoic, para-amino benzoic, anthranilic, para-hydroxybenzoic, salicylic or para-aminosalicylic acid; methanesulfonic, ethanesulfonic, hydroxyethanesulfonic, ethylenesulfonic, toluenesulfonic, naphthalenesulfonic acids or sulphanilic acid; methionine, tryptophan, lysine or arginine. With bases, such as metal hydroxides, salts are likewise formed, for example alkali metal salts or alkaline earth metal salts. Resulting salts can be converted into the free compounds.

The salts are also suitable for purifying the free compounds. In view of the close relationship between the free compounds and their salts, what has been said above and hereinafter with regard to the free compounds refers, wherever possible and appropriate, also to the corresponding salts.

The invention includes also any modification of the process in which an intermediate obtained at any stage of the process is used as starting material and any remaining step or steps is or are carried out, or the process is discontinued at any stage thereof, or in which a starting material is formed under the reaction conditions or is used in the form of one of its salts.

The new compounds and their salts may be used as medicaments, for example in the form of pharmaceutical preparations containing them or their salts in conjunction or admixture with a solid or liquid organic or inorganic pharmaceutical excipient suitable for local, enteral or parenteral administration. Suitable excipients are substances that do not react with the new compounds, for example water, gelatin, lactose, starches, magnesium stearate, talcum, white petroleum jelly, vegetable oils, benzyl alcohols, gums, polyalkyleneglycols, cholesterol or other known medicinal excipients. The pharmaceutical preparations may be, for example, tablets or dragees, or in liquid form solutions, suspensions or emulsions. They may be sterilized and/or contain assistants, such as preserving, stabilizing, wetting or emulsifying agents, salts for regulating the osmotic pressure or buffers. They may also contain other therapeutically useful substances. The preparations are formulated in the usual manner. They contain the active principle, for example, in an amount of 1–50 mg. per unit dose. The amount of excipient may of course vary within wide limits, but the new preparations for oral or parenteral administration contain 0.1 to 15% of active principle, and for local administration, for example, 1 to 60% of active principle.

The starting materials are known or, insofar as they are new, they can be prepared by known methods.

The following examples illustrate the invention.

*Example 1*

26.56 g. of rutin (40 mmols) are dissolved under nitrogen in 400 ml. of pyridine and mixed within 3 minutes with a mixture of 56.5 ml. of 0.85-molar methanolic dimethylamine solution (48 mmols) and 27.5 ml. of 1.75-molar methanolic formaldehyde solution. After 1 hour's stirring at 20° C. the batch is cooled to 6° C. and mixed with 290 ml. of glacial acetic acid (5.05 mols). When the solution has again heated up to 20° C. it is mixed with 4.8 liters of chloroform while being vigorously stirred; the precipitate formed is vigorously stirred for 5 minutes, suctioned off, sucked dry, washed with 100 ml. of chloroform and dried for 2 hours at 50° C. under a high vacuum.

26.8 g. of the resulting light-yellow material are dissolved in 322 ml. of pyridine and mixed at 10° C. with 650 ml. of chloroform while being vigorously stirred. After 10 minutes' stirring the resulting suspension is suctioned into a 3-liter round-bottom flask and the filter residue, consisting predominantly of 3-rutinosido-5,7,3',4'-tetrahydroxy-6,8-bis-(dimethylaminomethyl)-flavonol, is rinsed with 50 ml. of chloroform. The precipitate is dried as described above.

The filtrate is mixed with another 2.5 liters of chloroform, stirred for 10 minutes and then filtered, rinsed and dried as described above. The resulting product is 3-rutinosido-5,7,3',4'-tetrahydroxy-8-dimethylaminomethyl-flavonol. It can be further purified by mixing 21.5 g. of the dry material with 32 ml. of ice-cooled N-hydrochloric acid, causing the material to dissolve by adding 10 ml. of water (pH=2.8), stirring the solution and mixing it with 32 ml. of N-sodium bicarbonate solution and then with 2 N-sodium hydroxide solution to adjust it to the isoelectric points (pH=7). The product crystallizes. After 2 hours the crystallisate is filtered off and dried as described above, to yield pure 3-rutinosido-5,7,3',4'-tetrahydroxy-8-dimethylaminoethyl-flavonol of the formula

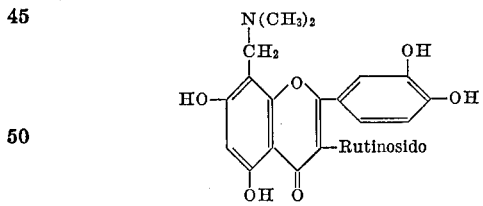

which, after one recrystallization from water, can be characterized thus:

It is readily soluble in aqueous hydrochloric or sulfuric acid, in glacial acetic acid, pyridine, dimethylsulfoxide and formamide, moderately soluble in methanol and water, and sparingly soluble in ether and benzene.

*Elementary analysis.*—$C_{30}H_{37}O_{16}H$, Calculated: C, 53.97; H, 5.59; N, 2.10%. Found: C, 53.67; H, 5.59; N, 2.11%.

Molecular weight: 667.62.

Optical rotation $[\alpha]_D = -16° \pm 2°$ (c=0.5, in water).

Bands in the infrared spectrum in Nujol, inter alia, at 2.97, 3.44, 3.70, 6.01, 6.25, 6.33, 6.45, 6.60, 6.88, 7.26, 7.40, 7.55, 7.77, 7.98, 8.29, 8.48, 8.84, 8.95, 9.15, 9.36, 9.52, 9.74, 9.92, 10.08, 10.22, 10.67, 10.80, 11.18, 11.78, 11.95, 12.10, 12.40, 12.62, 12.76, 13.25, 13.65, 14.40μ.

Ultraviolet spectrum in absolute alcohol: $\lambda_{max}$=269 mμ (ε=19600) and 364 mμ (ε=16700).

Proton resonance spectrum, signals at 457/b (2), 412/d/J=9 (1), 364/s (1), 310/s (10), 266/s (2), 235/s (3), 199/d/J=9 (9), 146/s (6), 117/d/J=14 (1), 60/b (3).

The proton resonance spectra shown here and in the following examples were determined with the use of a Varian–DP–60 spectrometer at 60 megacycles per second in deutero dimethylsulphoxide. The signals, shown in c.p.s. and referred to tetramethylsilane as internal standard, were designated as follows: s=singlet, d=doublet, b=broad, unresolved signal complex, J=coupling constant. The proton numbers, rounded up or down, determined by electron integration, are shown in parentheses.

Titration reveals the following values: pK's=5.70 and 8.25 in water, and 6.05 and 9.35 in methyl Cellosolve.

In the thin-layer chromatography on cellulose in the system secondary butanol+isopropanol+monochloroacetic acid+water (7 parts by volume:1 part by volume:0.3 part by weight:4 parts by volume), stained with an aqueous solution of 5 g. of ferric chloride and 5 g. of potassium ferricyanide per liter, Rf value=0.47.

In the paper chromatogram (Whatman 1 paper), descending, in the above system, stained as described above, Rf value=0.40.

Example 2

A solution of 1.0 g. of rutin (1.45 mmols) in 4 ml. of pyridine and 4 ml. of water is cooled to 2° C., and a mixture of 0.85 ml. of 5.3-molar aqueous dimethylamine solution (4.5 mmols) and 0.36 ml. of 13.5-molar aqueous formaline solution (4.5 mmols) in 1 ml. of water is stirred in. After stirring for 5 minutes at 2° C., 145 ml. of ice-cooled ethanol are added, the precipitate is filtered off and dried for 2 hours at room temperature in a water-jet vacuum.

The dried material (0.95 g.) is dissolved in 1.6 ml. of water, the solution is cooled to 2° C. and adjusted to pH=4 with 1.65 ml. of ice-cooled aqueous hydrochloric acid, and then to pH=5.6 with 0.56 ml. of N-aqueous sodium bicarbonate solution. The solution is then mixed with 63 ml. of ice-cooled ethanol and the precipitate, which contains a proportion of dimeric product, is filtered off. Addition of another 100 ml. of acetone produces another precipitate which is filtered off and dried. The resulting 3 - rutinosido - 5,7,3',4' - tetrahydroxy - 6,8 - bis-(dimethylaminomethyl)-flavonol of the formula

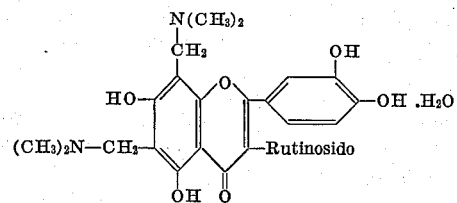

displays the following characteristics:

It is readily soluble in water, aqueous hydrochloric acid and sulfuric acid, in pyridine, dimethylsulfoxide and methanol, and sparingly soluble in benzene and ether.

Elementary analysis.—$C_{33}H_{44}O_{16}N_2 \cdot 1H_2O$: Calculated, C, 53.37; H, 6.24; N, 3.77%. Found: C, 53.49, H, 6.22; N, 3.46%.

Molecular weight: 742.73.

Optical rotation $[\alpha]_D = -15 \pm 1°$ (c=1, in water).

Ultraviolet spectrum in absolute alcohol: $\lambda_{max}$=279 m$\mu$ ($\epsilon$=22000) and 374 m$\mu$ ($\epsilon$=16100).

Infrared spectrum in Nujol, bands inter alia at 3.00, 3.44, 6.03, 6.05, 6.25, 6.47, 6.84, 7.12, 7.25, 7.55, 7.78, 7.90, 8.37, 8.90, 9.15, 9.40, 10.17, 10.65, 10.95, 11.40, 12.00, 12.37, 12.70$\mu$.

Proton resonance spectrum; signals: 456/b (2), 412/d/J=9 (1), 350/b (8), 315/b (2), 264/s (1), 234/s (5), 194/b (11), 151/s+145/s (total 12), 125/s (1), 111/s (2), 60/s (3).

Titration: pK's in water 8.01 (2 buffer regions) in methyl Cellosolve 7.92 (2 buffer regions).

Thin-layer chromatogram: as in Example 1; Rf=0.33.

Paper chromatogram: as in Example 1; Rf=0.19.

Example 3

32 g. of rutin (50 mmols) are dissolved at room temperature in 2700 ml. of a 1:1-mixture of methanol and ethanol, and 7.9 ml. of a 6.35-molar aqueous dimethylamine solution (50 mmols) and 4.1 ml. of 12.3-molar aqueous formaldehyde solution (50 mmols) in 480 ml. of water are stirred in. The reaction solution is stirred for 1 hour at room temperature under nitrogen and then heated for 4 hours at 60° C., cooled to 5° C., and the crystalline precipitate is suctioned off and pressed on the filter with a rubber diaphragm. After drying for 11 hours at room temperature in a high vacuum the light-yellow, pulverulent material (7.5 g.) is dissolved in 37.5 ml. of 0.1 N-hydrochloric acid solution and 375 ml. of ethanol are stirred in. The precipitate is suctioned off.

The filtrate is neutralized with 35 ml. of 0.1 N-sodium hydroxide solution, whereupon a precipitate forms which is filtered off, washed with 100 ml. of ethanol and dried as described above, to yield an orange-colored powder which is found to be unitary both chromatographically and electrophoretically, being 3-rutinosido-5,7,3',4'-tetrahydroxy - 6 - [3"-rutinosido-5"',7"',3"',4"'-tetrahydroxy-6"' - dimethylaminomethyl - flavonol-(8")-yl-methyl]-8-dimethylaminomethyl-flavonol of the formula

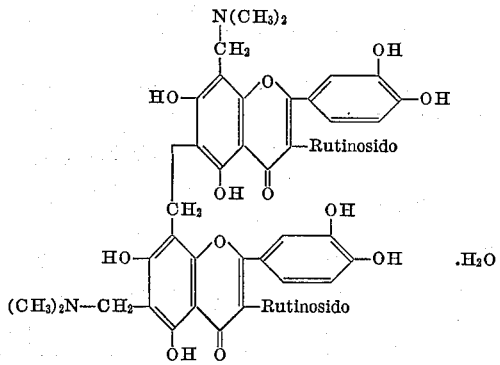

The new compound is characterized as follows: It is readily soluble in water, aqueous hydrochloric and sulfuric acid, pyridine, dimethylsulphoxide, formamide and methanol, sparingly soluble in benzene and ether. From ethanol it settles out in the form of the complex.

Elementary analysis.—$C_{61}H_{74}O_{32}N_2 \cdot 1H_2O$: Calculated, C, 53.67; H, 5.61; N, 2.05%. Found: C, 53.38; H, 5.65; N, 2.05%.

Molecular weight: 1365.26.

Optical rotation $[\alpha]_D = +86 \pm 1°$ (c=1, in water).

Ultraviolet spectrum in absolute alcohol: $\lambda_{max}$ 279 m$\mu$ ($\epsilon$=50800) and 364 m$\mu$ ($\epsilon$=28000).

Infrared spectrum in Nujol, bands at: 3.05, 3.42, 5.89, 6.05, 6.40, 6.87, 7.79, 8.30, 8.85, 9.13, 9.40, 10.20, 12.38$\mu$.

Proton resonance spectrum; signals: 454/s+446/s+438/s (total 4), 401/d/J=9 (2), 317/s (20), 266/s (4), 230/b (S), 195/b (16), 103/b (14), 62/b (6).

Titration: pK's in water 8.40 and 9.28 in 80% methyl Cellosolve 7.98 and 9.10.

Thin-layer chromatogram (as in Example 1): Rf=0.20.
Paper chromatogram (as in Example 1): Rf=0.085.

Example 4

32 g. of rutin (50 millimols) are dissolved in 265 ml. of 0.4 N methanolic sodium hydroxide solution (106 millimols), 100 ml. of methanol and 700 ml. of pyridine and treated with an ice-cooled solution of 153 ml. of 0.85 molar methanolic dimethylamine solution (130 millimols) and 43.5 ml. of 1.5 molar methanolic formaldehyde solution (65 millimols) with stirring, and stirring is continued for 4 hours at 20° C. The precipitate is filtered with suction and discarded. The filtrate is treated with 3 liters of chloroform and the precipitate filtered with suction and dried for 15 hours in a high vacuum at 20° C.

For further purification 28 g. of dried material are dissolved in 100 ml. of N acetic acid. The solution is then treated with 500 ml. of methanol and 1000 ml. of ethanol, filtered and the filtrate treated with another 2000 ml. of acetone and 2000 ml. of ether. After filtering and drying (as described above) pure 3-rutinosido-5:7:3':4'-tetrahydroxy-6-dimethylaminomethyl-flavonol of the formula

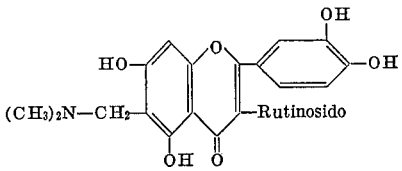

is obtained.

For analysis 1.3 g. of substance are dissolved in 4 ml. of water, treated with 1.9 ml. of N hydrochloric acid (1.9 millimols) (pH=4.6), filtered through cottonwool, adjusted to a pH value of 6.7 by the addition of 2.7 ml. of N sodium bicarbonate solution (2.7 millimols) and cooled to 0° C. After 1 hour the fine, yellow needles are filtered with suction and dried for 15 hours in a high vacuum at 20° C.

The substance is readily soluble in aqueous hydrochloric acid or sulfuric acid, in glacial acetic acid, pyridine, dimethylsulfoxide, formamide, methanol and water, sparingly soluble in ether and benzene.

*Elementary analysis.*—$C_{30}H_{37}O_{16}N_1 \cdot \frac{1}{2}H_2O$ (676.61): Calculated: C, 53.26; H, 5.66; N, 2.07. Found: C, 53.19; H, 5.49; N, 1.91.

Optical rotation $[\alpha]_D = -11° \pm 1°$ ($H_2O$: c=1).

Ultraviolet spectrum in absolute alcohol $\lambda_{max}$ 276 m$\mu$ ($\epsilon$=22000), $\lambda$ shoulder 330 m$\mu$ ($\epsilon$=11000) $\lambda_{max}$ 371 m$\mu$ ($\epsilon$=15900).

Infrared spectrum (Nujol), bands at 3.00; 3.45, 3.68, 6.05, 6.30, 6.81, 7.75, 8.30, 8.30, 8.90, 9.17, 9.40, 9.60, 10.20, 12.35, 12.65$\mu$.

Proton resonance spectrum, signals at 445/b (2), 410/d/J=9 (1), 372/s (1), 317/s (11), 267/s (1), 232/s (3), 207/s+185/s (total 9), 145/s (6), 63/b (3).

Thin-layer chromatogram (as in Example 1) Rf value=0.52.

Example 5

45 g. (73 mmols) of rutin are dissolved in 600 ml. of dimethylformamide, and 5.9 ml. of pyridine are added. (Solution A.)

5.8 ml. (77 mmols) of 13.3 molar aqueous formaldehyde solution are introduced into 154 ml. of 1-molar diethylamine solution in dimethylformamide, and 50 g. of calcium sulfate ($\frac{1}{2}H_2O$) are added. After ten minutes, the reaction mixture is filtered (solution B), the calcium sulfate being rinsed with 20 ml. of dimethylformamide. The solution B is added dropwise to solution A, with the exclusion of moisture, and stirred for 2 hours at room temperature.

Hydrogen chloride gas is then introduced into the solution until the indicator paper shows a pH of 3–4. The so-acidified solution is treated with 4.5 liters of ether with stirring, allowed to stand overnight at 0° C. and then decanted off. The decantation residue is dissolved in 1 liter of water, whereupon the solution is adjusted to pH=5.7 with 2 N sodium hydroxide solution and then concentrated to 0.5 liter in vacuo.

1 liter of ethanol is then added to the reaction mixture and the precipitate of 3-rutinosido-5,7,3',4'-tetrahydroxy-8-diethylaminomethyl-flavonol of the formula

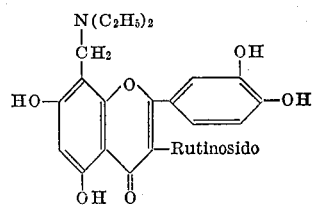

is filtered with suction and dried.

2 grams of this crude material are distributed between 0.5 N acetic acid and n-butanol (10 ml. of lower phase, 10 ml. of upper phase, 165 distribution stages).

Pure substance is present in fraction 13 and in thin layer chromatogram on cellulose in the system secondary butanol+isopropanol+monochloracetic acid+water (7 parts by volume:1 part by volume:0.3 part by weight:4 parts by volume) on a mercury quartz lamp (with Corning filter No. 9863 $\lambda_{max}$ 365 m$\mu$) shows a unitary brown spot with Rf 0.53.

In the proton resonance spectrum the signal of the aromatic proton in position 6 [388/s (1)] can be seen.

Example 6

A mixture is prepared from 108 ml. of 1.85 molar methanolic diethylamine solution (200 mmols), 10 ml. of 10 molar aqueous formaldehyde solution (100 mmols), 200 ml. of methanol, 500 ml. of 0.4 molar methanolic sodium hydroxide solution (200 m-equivalents) which is stirred for 30 minutes with 80 g. of anhydrous sodium sulfate. The suspension is poured at room temperature into a solution of 64 g. of rutin (100 mmols) in 500 ml. of methanol and stirred for 20 minutes. The solution is then cooled to 0° C., and 83 ml. of 4.25 molar methanolic hydrochloric acid (350 mmols) are added. The precipitated inorganic salts are filtered off and the filtrate treated with 15 liters of acetone, 3-rutinosido-5,7,3',4'-tetrahydroxy-6-diethylaminomethyl-flavonol of the formula

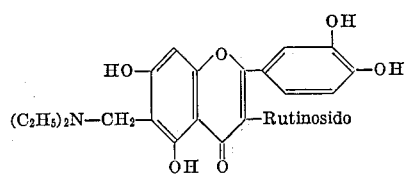

being isolated.

2 g. of this crude material are distributed between 0.5 N acetic acid and n-butanol (10 ml. of lower phase, 10 ml. of upper phase, 165 distribution stages).

Pure substance is present in fractions 15 to 22 and in the thin layer chromatogram on cellulose in the system secondary butanol+isopropanol+monochloracetic acid+water (7 parts by volume:1 part by volume:0.3 part by weight:4 parts by volume) on the mercury quartz lamp (with Corning filter No. 9863 $\lambda_{max}$ 365 m$\mu$) shows a unitary pale-brown spot with Rf 0.55.

In the proton resonance spectrum the signal of the aromatic proton in position 8 [404/s (1)] can be seen.

Example 7

1.0 g. of rutin (1.45 mmols) is dissolved in 4 ml. of pyridine and 4 ml. of water, the solution is cooled to 2° C. and treated with stirring with a mixture of 0.85 ml. of 5.3 molar aqueous diethylamine solution (4.5 mmols) and 0.36 ml. of 13.5 molar aqueous formalin solution (4.5 mmols) in 1 ml. of water. After the batch has been stirred for 5 minutes at 2° C., it is treated with 145 ml. of ice-cooled ethyl alcohol; the precipitate is filtered off and dried for two hours at room temperature at a waterjet vacuum. The dried material is dissolved in 1.6 ml. of water, the solution cooled to 2° C. and adjusted to pH 4 with 1.65 ml. of ice-cooled aqueous N-hydrochloric acid. The solution is adjusted to pH=5.6 with 0.56 ml. of N-aqueous sodium bicarbonate solution. The solution is then treated with 63 ml. of ice-cooled ethanol and the precipitate, which contains some dimers, is filtered off. With a further 200 ml. of acetone a precipitate of 3- rutinosido-5,7,3',4'-tetrahydroxy-6,8-bis - (diethylaminomethyl)-flavonol of the formula

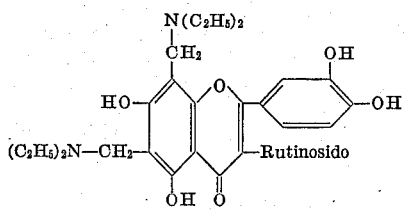

is obtained.

2 g. of this crude material are distributed between 0.5 N acetic acid and n-butanol (10 ml. of lower phase, 10 ml. of upper phase, 165 distribution stages).

Pure substance is in the fractions 4 to 7 and in the thin layer chromatogram on cellulose in the system secondary butanol+isopropanol+monochloracetic acid+water (7 parts by volume:1 part by volume:0.3 part by weight:4 parts by volume) on a mercury quartz lamp (with Corning filter No. 9863 $\lambda_{max}$ 365 m$\mu$) shows a unitary, intensively brilliant, orange-colored spot with R$f$=0.45.

*Example 8*

40 g. of rutin (62.5 mmols) are dissolved at room temperature in 1700 ml. of methanol+ethanol (1:1) mixture and treated with stirring with 10 ml. of 6.3 molar diethylamine solution (62.5 mmols) and 5 ml. of 12.35 molar aqueous formaldehyde solution (62.5 mmols) in 300 ml. of water.

The reaction solution is stirred for 1 hour at room temperature and then maintained at 50° C. for 5 hours. The reaction solution is allowed to stand for 14 hours at 4° C. and the precipitate filtered with suction.

The filtrate is treated with 2.5 ml. of 12.35 molar aqueous formaldehyde solution (31.25 mmols) and then kept for another 5 hours at 50° C. It is then cooled as described above and filtered with suction.

The two filtration residues are combined, dissolved in 100 ml. of water at 0° C., the pH value is adjusted to 3.5 with 2 N-hydrochloric acid and the solution evaporated and dried. The evaporation residue is dissolved in 266.8 ml. of water, the pH value adjusted to 8 with 3.2 ml. of 2 N sodium hydroxide solution, and 1080 ml. of ethanol are added. The precipitated 3-rutinosido-5,7,3',4'-tetrahydroxy-6-[3"-rutinosido - 5"',7"',3"',4"'' - tetrahydroxy - 6" - diethylaminomethyl - flavonol - (8") - yl-methyl]-8-diethylaminomethyl-flavonol of the formula

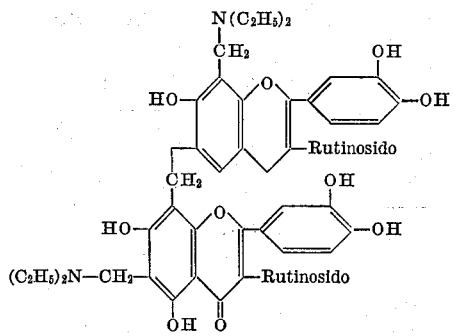

is filtered off, dissolved at 0° C. in 200 ml. of water and the pH value adjusted to 3.5 with 2.1 ml. of 2 N hydrochloric acid, and evaporated.

For the purpose of purification, 1 g. of the evaporation residue is dissolved in 19 ml. of water at 0° C., the pH value adjusted to 8.0 with 1 ml. of 0.5 N sodium hydroxide solution, and 5 ml. of ethanol added.

The precipitate is filtered off, dissolved in 10 ml. of water, the pH value is adjusted to 3.5 with 0.5 ml. of 0.5 N hydrochloric acid, and subjected to lyophilisation.

The substance shows in the thin layer chromatogram on cellulose in the system secondary butanol+isopropanol+monochloracetic acid+water (7 parts by volume:1 part by volume:0.3 part by weight:4 parts by volume) on a mercury quartz lamp (with Corning filter No. 9863 $\lambda_{max}$ 365 m$\mu$) a unitary brown spot with R$f$=0.43.

*Example 9*

40 g. of rutin (62.5 mmols) are dissolved in 380 ml. of methanol and treated with 331 ml. of 0.4 N methanolic sodium hydroxide solution (125 molar equivalents), (solution A).

10.9 ml. of morpholine (125 mmols) are diluted with 120 ml. of methanol and 6.25 ml. of 10 molar aqueous formaldehyde solution (62.5 mmols), and 55 g. of anhydrous sodium sulfate are added. (Suspension B.)

After 30 minutes, B is poured into A, and the batch is then heated with exclusion of moisture for 2 hours at 60° C. with stirring. After allowing the reaction mixture to cool to 10° C., it is treated with 67 ml. of 3.6 molar methanolic hydrochloric acid (pH indicator paper=3-4) and the inorganic salts are filtered off. The filtrate is evaporated. 3 - rutinosido - 5,7,3',4' - tetrahydroxy - 6-morpholinomethyl-flavonol of the formula

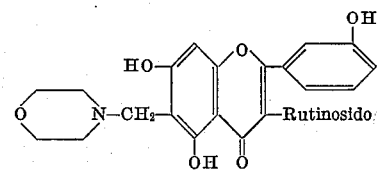

is obtained.

2 g. of this crude material are distributed between 0.5 N acetic acid and n-butanol (25 ml. of lower phase, 25 ml. of upper phase, 165 distribution stages).

Pure substance is in the fractions 14–19 and in the thin layer chromatogram on cellulose in the system secondary butanol+isopropanol+monochloracetic acid+water (7 parts by volume:1 part by volume:0.3 part by weight:4 parts by volume) on the mercury quartz lamp (with Corning filter No. 9863 $\lambda_{max}$ 365 m$\mu$) shows a unitary spot with R$f$ 0.55.

In the proton resonance spectrum the signal of the aromatic proton in position 8=[405/s (1)] can be seen.

*Example 10*

45 g. of rutin (73 mmols) are dissolved in 600 ml. of dimethylformamide and treated with 5.9 ml. of pyridine (solution A).

5.8 ml. of 13.3 molar aqueous formaldehyde solution (77 mmols) are diluted with 12.3 ml. (73 mmols) of morpholine in 170 ml. of dimethylformamide, and 60 g. of calcium sulfate (½ H$_2$O) are added. After 10 minutes the reaction mixture is filtered (solution B), the calcium sulfate being rinsed with 20 ml. of dimethylformamide.

Solution B is added dropwise to solution A with the exclusion of moisture and the batch is stirred for 6 hours at 60° C.

Hydrogen chloride gas is introduced into the solution at 0° C. until a moistened indicator paper shows a pH value of 3–4.

The so-acidified solution is treated with 5 liters of ether with stirring, allowed to stand overnight at 0° C. and decanted off. The decantation residue is dissolved in 1 liter of water and the pH value of the solution adjusted to 5.7 with 2 N hydrochloric acid; the batch is then evaporated to 0.4 liter in vacuo, treated with 1 liter of ethanol and the precipitated 3-rutinosido - 5,7,3',4' - tetrahydroxy - 8-morpholinomethyl-flavonol of the formula

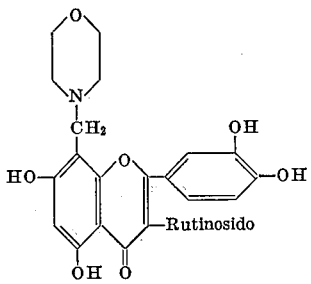

is filtered with suction and dried.

2 g. of this crude material are distributed between 0.5 N acetic acid and n-butanol (25 ml. of lower phase, 25 ml. of upper phase, 165 distribution stages).

Pure substance is in fraction 12, and in the thin layer chromatogram on cellulose in the system secondary butanol+isopropanol+monochloracetic acid+water (7 parts by volume:1 part by volume:0.3 part by weight:4 parts by volume) on a mercury quartz lamp (with Corning filter No. 9863 λ$_{max}$ 365 mμ) shows a unitary brown spot with Rf 0.54.

In the proton resonance spectrum the signal of the aromatic proton in position 6[393/s (1)] can be seen.

*Example 11*

6.3 g. of rutin (10 mmols) are dissolved in 40 ml. of pyridine and 40 ml. of water, treated with 5 ml. of 2 N sodium hydroxide solution and then with 3.4 ml. of morpholine (40 mmols) in 1.48 of 13.5 molar formaldehyde solution (20 mmols) at 40° C. and allowed to react at the same temperature for 2 hours with stirring. After cooling to 2° C., the reaction mixture is then treated with 1.5 liters of ethanol and filtered with suction.

The filtration residue is dissolved in 16 ml. of water at 0° C., the pH value is adjusted to 4 with N hydrochloric acid and then to 5.6 with N aqueous sodium bicarbonate solution. The solution is then treated with 600 ml. of ice-cooled ethanol and the precipitate, which contains some dimers, is filtered off.

With a further 2 liters of acetone a precipitate of 3-rutinosido-5,7,3'-4'-tetrahydroxy - 6,8 - bis - (morpholinomethyl)-flavonol of the formula

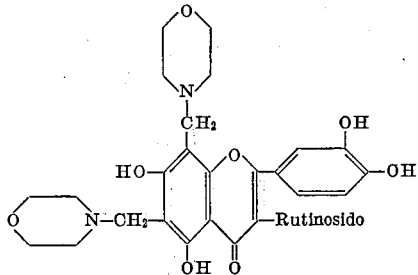

is obtained.

2 g. of this crude material are distributed between 0.5 N acetic acid and n-butanol (25 ml. of lower phase, 25 ml. of upper phase, 165 distribution stages).

Pure substance is in fraction 8, and in the thin layer chromatogram on cellulose in the system secondary butanol+isopropanol+monochloracetic acid+water (7 parts by volume:1 part by volume:0.3 part by weight:4 parts by volume) on a mercury quartz lamp (with Corning filter No. 9863 λ$_{max}$ 365 mμ) shows a unitary brown-green spot with Rf 0.33.

*Example 12*

40 g. of rutin (62.5 mmols) are dissolved in 1700 ml. of methanol+ethanol (1:1) mixture and treated with 5.45 ml. of morpholine (62.5 mmols) and 5.1 ml. of 12 molar aqueous formaldehyde solution (62.5 mmols) in 305 ml. of water.

The batch is heated for 2 hours at 25° C. and then for 5 hours at 50° C. 5.1 ml. of 12 molar aqueous formaldehyde solution (62.5 mmols) are again added and the whole stirred for another 5 hours at 50° C. After cooling the batch to 0° C., it is filtered off from a slight amount of precipitate (2.4 g.).

The filtrate is adjusted to pH 3.5 with 17 ml. of 2 N hydrochloric acid and then evaporated (evaporation residue A).

The evaporation residue A is dissolved in 800 ml. of water, the pH value adjusted to 8.2 with 23.5 ml. of 2N sodium hydroxide solution, and then treated at 0° C. with 1.6 liters of ethanol, and then with 2.4 liters of ether. The precipitate is taken up in 500 ml. of methanol, treated with 4.5 ml. of 3.6 molar methanolic hydrochloric acid (pH=3–4, on moist indicator paper) and evaporated (evaporation residue B). 20 g. of evaporation residue B are reprecipitated as described above from 400 ml. of water, 7.4 ml. of 2 N sodium hydroxide solution (pH 8.2), 800 ml. of ethanol and 1.2 liters of ether. The filter residue is taken up in 240 ml. of methanol, the pH value is adjusted to 3.5 with 4.5 ml. of 3.6 molar methanolic hydrochloric acid, and the batch evaporated (evaporation residue C). 14 g. of evaporation residue C are reprecipitated as described above at 0° C. from 63 ml. of water, 7.9 ml. of 2 N sodium hydroxide solution, and 72 ml. of ethanol.

The precipitate is taken up in 180 ml. of methanol after being filtered with suction, the pH value is adjusted to 3.5 with 1.16 ml. of 3.5 molar methanolic hydrochloric acid, and the batch evaporated (evaporation residue D).

10 g. of evaporation residue D are reprecipitated as described above at 0° C. from 90 ml. of water, 2.7 ml. of 2N sodium hydroxide solution, and 100 ml. of ethanol and filtered with suction, pure 3 - rutinosido - 5,7,3',4'-tetrahydroxy - 6 - [3″ - rutinosido - 5‴, 7″,3‴,4‴ - tetrahydroxy - 6″ - morpholinomethyl - flavonol - (8″) - ylmethyl]-8-morpholinomethyl flavonol of the formula

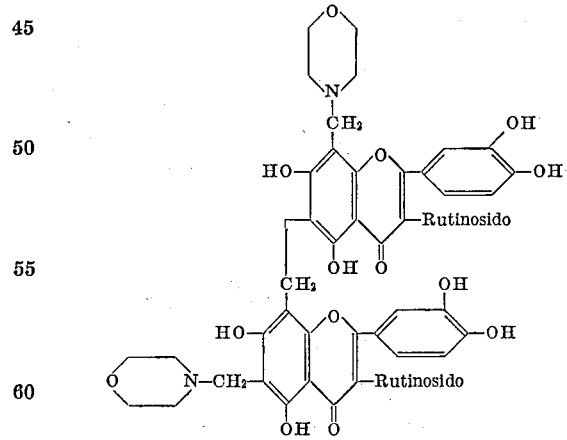

being obtained.

In the thin layer chromatogram on cellulose in the system secondary butanol+isopropanol+monochloracetic acid+water (7 parts by volume:1 part by volume:0.3 part by weight:4 parts by volume) the substance shows on the mercury quartz lamp with Corning filter No. 9863 λ$_{max}$ 365 mμ a pure grey-brown spot with Rf 0.18.

*Example 13*

800 g. of rutin (1.25 mmols) are dissolved in 34 liters of a mixture of methanol+ethanol (1:1). 200 ml. of 6.3 molar aqueous dimethylamine solution (1.25 mols) and 105 ml. of 12 molar aqueous formaldehyde solution (1.25 mols) are diluted with 6 liters of water, poured into the rutin solution and the mixture stirred for 2 hours at room temperature. The batch is then heated in a hot bath to 50° C. solution temperature and then stirred for another 5 hours.

The batch is allowed to stand overnight in a refrigerator (0° C.) and then filtered off.

The filtrate is treated with a further 105 ml. of 12 molar aqueous formaldehyde solution and stirred for another 5 hours at 50° C., then cooled to 0° C. and filtered with suction.

The two filtration residues are suspended at 0° C. in 2.4 liters of water, the pH value is then adjusted to 3.5 with 2 N hydrochloric acid, and the remaining alcohol is distilled off in a rotary evaporator. After cooling to 4° C., the solution is made up to 2.4 liters with distilled water, and the pH value adjusted to 5.8 with 2 N sodium hydroxide solution. 7.2 liters of acetone are added while stirring vigorously and, after 1 hour, the precipitated, viscous oil is decanted off.

The decanted solution is adjusted to pH=8 with 2 N sodium hydroxide solution, and the resulting powdery precipitate is rapidly filtered off.

The filtration residue is suspended in 8 liters of distilled water at 0° C., and rapidly acidified to pH 3.5 with 2 N hydrochloric acid. The acetone is eliminated in a rotary evaporator (12 torr.), the solution is cooled to 4° C., and made up to 9 liters with water, the pH value is adjusted to 8.0 with 2 N sodium hydroxide solution and treated with 1 liter of absolute ethanol. The resulting alcoholate of 3-rutinosido-5,7,3',4'-tetrahydroxy - 6 - [3″ - rutinosido -5″,7″,3‴,4‴ - tetrahydroxy - 6″ - dimethyl-aminomethyl - flavonol - (8″) - yl-methyl]-8-dimethyl-aminomethyl-flavonol of the formula

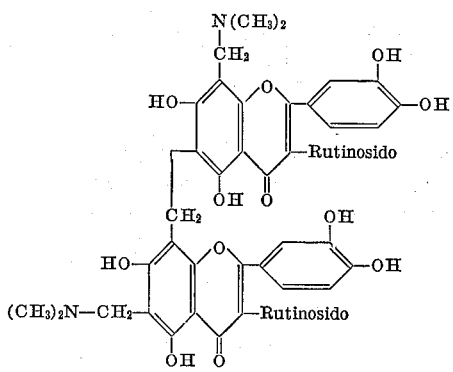

is filtered with suction and converted into the corresponding salt by being dissolved in an aqueous acid solution, for example, hydrochloric acid or tartaric acid, evaporation or precipitation with ether/acetone or lyophilisation.

Thin layer chromatogram (as in Example 1): R$f$=0.20.

*Example 14*

8 g. of rutin (12.5 mmols) are dissolved in 340 ml. of a mixture of methanol and ethanol (1:1), treated with 1 ml. of 6.25 molar aqueous dimethylamine solution and 1.25 ml. of 10 molar aqueous formaldehyde solution (12.5 mmols) and stirred for 5 hours at 50° C. After being cooled to room temperature, the crystalline residue is filtered off.

2 g. are distributed between 0.5 N acetic acid and n-butanol (25 ml. of lower phase, 25 ml. of upper phase, 165 distribution stages).

The fraction No. 7 contains the pure 3-rutinosido-5,7, 3',4'-tetrahydroxy - 6 - [3″-rutinosido-5″,7″,3‴,4‴-tetrahydroxy-flavonol - (8″) - yl-methyl]-8-dimethylaminomethyl-flavonol of the formula

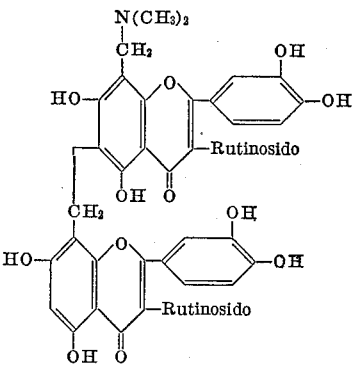

In the thin layer chromatogram on cellulose in the system secondary butanol+isopropanol+monochloracetic acid+water (7 parts by volume:1 part by volume:0.3 part by weight:4 parts by volume) on a mercury quartz lamp with Corning filter No. 9863 λ$_{max}$ 365 mμ the substance shows a brown-violet spot with R$f$=0.36.

In paper-chromatogram (Whatman No. 1 paper), descending in the above system the R$f$ value is 0.21. $C_{58}H_{67}O_{32}N$ (1290.15)

Calculated: N, 1.09%. Found: N, 1.01%.

*Example 15*

1 g. of the evaporation residue of the last filtrate, adjusted to pH 3.5, of Example 13 is dissolved in 38 ml. of water, the pH value is adjusted to 8.1 with 2 N sodium hydroxide solution, the reaction solution is treated with 270 ml. of ethanol and filtered off.

The filtrate is treated with 103 ml. of acetone, 27 ml. of ether and 27 ml. of chloroform, and the filtrate adjusted to pH 3.5 with 2 N hydrochloric acid at 0° C. and evaporated.

210 mg. of the evaporation residue are distributed between 0.5 N acetic acid and n-butanol (10 ml. of upper phase, 10 ml. of lower phase, 89 distribution stages).

The fractions 2,3,4,5 contain pure 3-rutinosido-5,7, 3',4'-tetrahydroxy - 8 - [3″-rutinosido-5″,7″,3‴,4‴-tetrahydroxy-6″-dimethylaminomethyl - flavonol - (8″) - yl-methyl]-6-dimethyl-aminomethyl-flavonol of the formula

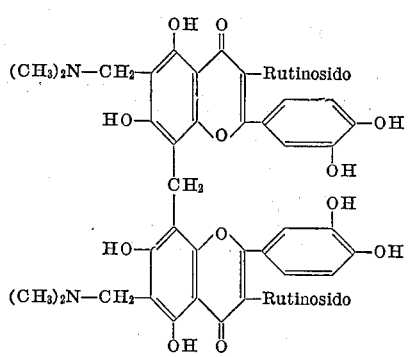

In the thin layer chromatogram on cellulose in the system secondary butanol+isopropanol+monochloracetic acid:water (7 parts by volume:1 part by volume:0.3 part by weight:4 parts by volume) stained with an aqueous solution of 5 g. of ferric chloride and 5 g. of potassium ferric cyanide per liter, the R$f$ value of the substance is 0.21.

What is claimed is:

1. A process for the aminomethylation of a flavonol, wherein a member selected from the group consisting of rutin of the formula

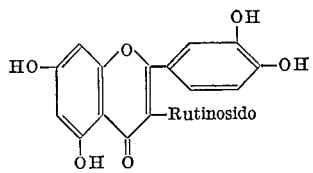

and a di-alkalimetal phenolate thereof is reacted with a secondary amine and formaldehyde or an agent yielding formaldehyde at a temperature of at most about 60° C.

2. A process as claimed in claim 1, wherein the aminomethyl compounds formed are isolated individually in pure form and a resulting salt is converted into the free compound or a resulting free compound is converted into a salt thereof.

3. A process as claimed in claim 1, wherein the reaction is carried out with an approximately equimolar quantity of formaldehyde under anhydrous conditions and at temperatures from −20 to +25° C. and the resulting compounds of the formula

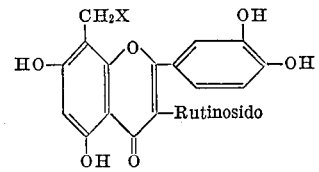

in which X represents a tertiary amino group are isolated.

4. A process as claimed in claim 1, wherein the reaction is carried out with a member selected from the group consisting of a di-alkalimetal phenolate of rutine and rutine in the presence of an agent yielding a di-alkalimetal phenolate, under anhydrous conditions and at temperatures from −20 to +25° C., and the resulting compounds of the formula

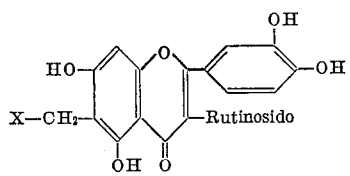

in which X represents a tertiary amino group are isolated.

5. A process as claimed in claim 1, wherein the reaction is carried out with approximately 2 mols of formaldehyde and at temperatures about 0 to 25° C. and the resulting compounds of the formula

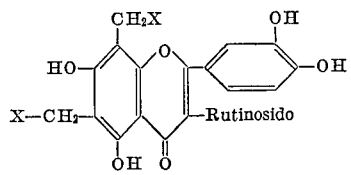

in which X represents a tertiary amino group, are isolated.

6. A process as claimed in claim 1, wherein the reaction is carried out in an aqueous medium at temperatures from 40 to 60° C. and the resulting compounds of the formula

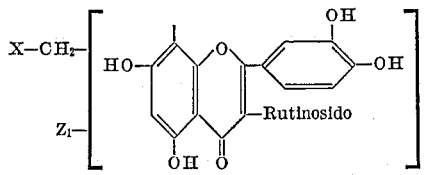

in which X represents a tertiary amino group and $Z_1$ represents a group of the formula

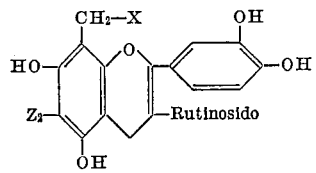

in which $Z_2$ represent a member selected from the group consisting of hydrogen and the group —$CH_2$—X, X representing a tertiary amino group, are isolated.

7. A process as claimed in claim 6, wherein the reaction is carried out in an aqueous alcohol.

8. A process as claimed in claim 1, wherein the reaction is carried out in an aqueous alcohol at temperatures from 40 to 60° C. and the resulting compounds of the formula

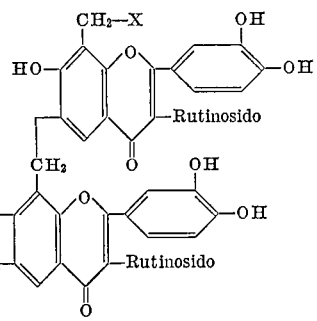

in which X represents a tertiary amino group, are isolated.

9. A member selected from the group consisting of a compound of the formula

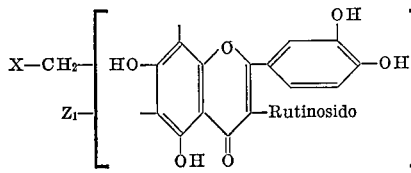

in substantially pure form, in which $Z_1$ represents a member selected from the group consisting of hydrogen, —$CH_2$—X and a radical of the formula

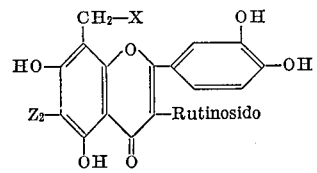

in which $Z_2$ represents a member selected from the group consisting of hydrogen and —$CH_2$—X, and X is a tertiary amino group, and salts thereof.

10. A compound as claimed in claim 9, said compound being a member selected from the group consisting of a compound of any one of the formulae

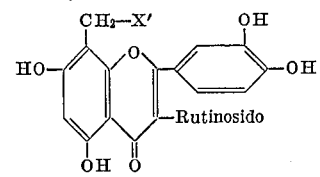

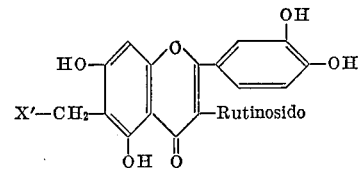

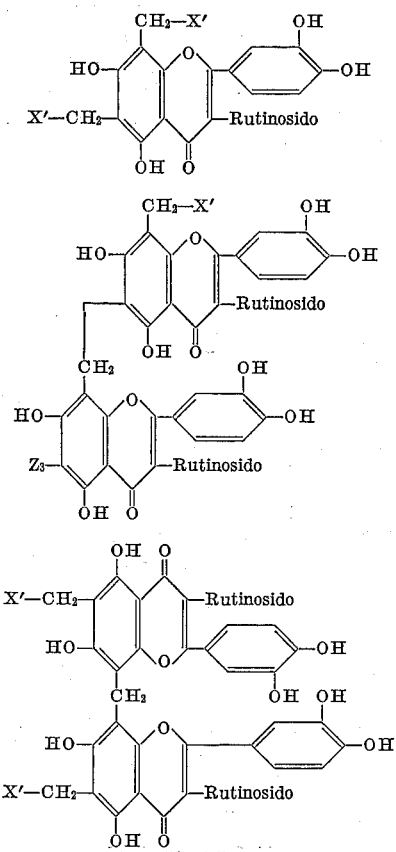

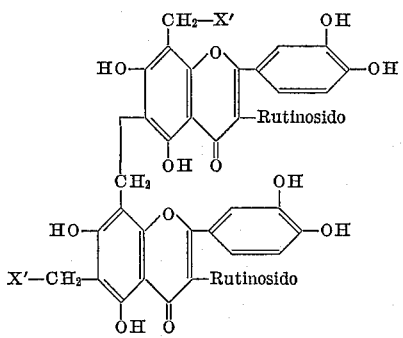

in substantially pure form, in which $Z_3$ represents a member selected from the group consisting of hydrogen and —$CH_2$—X', and the radicals X' represent members selected from the group consisting of dialkylamino, pyrrolidino, piperidino, morpholino, piperazino and N-methyl-, N-ethyl- or N-β-hydroxy-ethyl-piperazino, and salts thereof.

11. A compound as claimed in claim 9, said compound being a member selected from the group consisting of a compound of formula

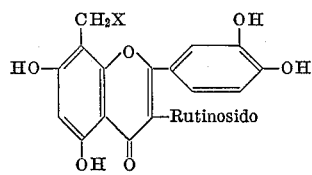

in substantially pure form, in which the radicals X' represent members selected from the group consisting of dialkylamino groups and pyrrolidino, piperidino, morpholino, piperazino and N-methyl-, N-ethyl-, and N-β-hydroxyethyl-piperazino groups, and salts thereof.

12. A compound as claimed in claim 9, said compound being a member selected from the group consisting of a compound of the formula

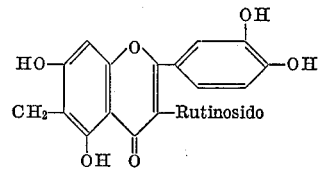

in substantially pure form, in which X stands for a member selected from the group consisting of dimethylamino, diethylamino and morpholino, and salts thereof.

13. A compound as claimed in claim 9, said compound being a member selected from the group consisting of a compound of the formula

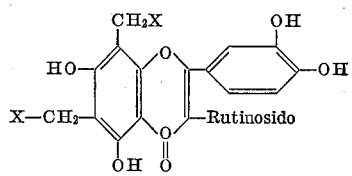

in substantially pure form, in which X stands for a member selected from the group consisting of dimethylamino, diethylamino and morpholino, and salts thereof.

14. A compound as claimed in claim 9, said compound being a member selected from the group consisting of a compound of the formula in substantially pure form, in which X stands for a member selected from the group consisting of dimethylamino, diethylamino and morpholino, and salts thereof.

15. A compound as claimed in claim 9, said compound being a member selected from the group consisting of 3-rutinosido-5,7,3',4'-tetrahydroxy - 6 - [3" - rutinosido-5",7",3''',4'''-tetrahydroxy-flavonol-(8)-yl - methyl] - 8-dimethylamino-methyl-flavonol of the formula

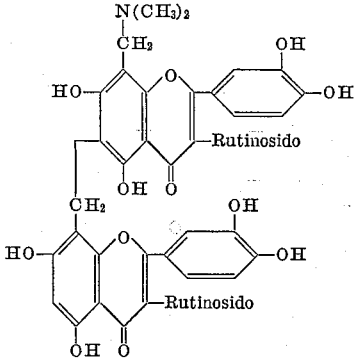

in substantially pure form, and salts thereof.

16. A compound as claimed in claim 9, said compound being a member selected from the group consisting of 3-rutinosido-5,7,3',4'-tetrahydroxy-6 - dimethylaminomethyl-8-[3"-rutinosido - 5",7",3''',4''' - tetrahydroxy - 6" - dimethylaminomethyl - flavonol - (8") - yl-methyl]-flavonol of the formula

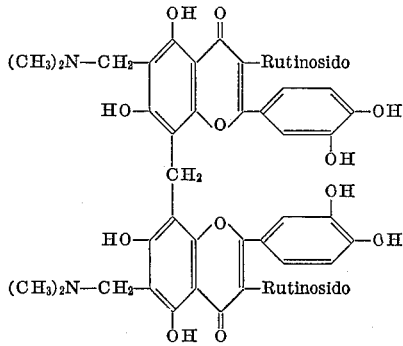

in substantially pure form, and salts thereof.

17. A compound as claimed in claim 9, said compound being a member selected from the group consisting of 3-rutinosido-5,7,3',4'-tetrahydroxy-6 - [3" - rutinosido-5",7",3''',4'''- tetrahydroxy - 6" - diethylaminomethyl-flavonol-(8")-yl-methyl]-8-diethylaminomethyl - flavonol of the formula

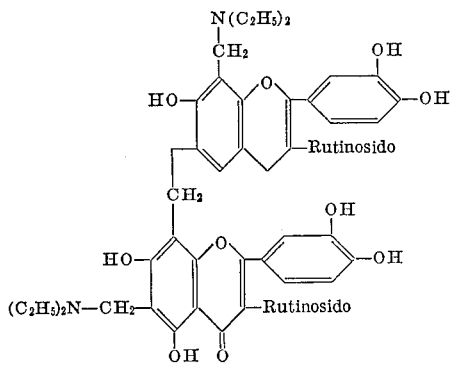

in substantially pure form, and salts thereof.

18. A compound as claimed in claim 9, said compound being a member selected from the group consisting of 3-rutinosido - 5,7,3',4' - tetrahydroxy-6 - [3" - rutinosido-5",7",3''',4'''-tetrahydroxy-6"-morpholinomethyl - flavonol-(8")-yl-methyl]-8-morpholinomethyl - flavonol of the formula

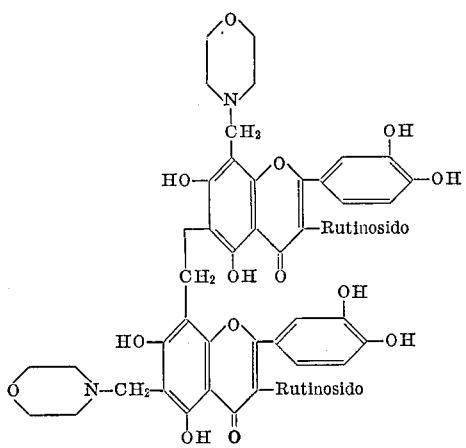

in substantially pure form, and salts thereof.

19. A compound as claimed in claim 9, said compound being a member selected from the group consisting of 3-rutinosido-5,7,3',4'-tetrahydroxy-6 - [3" - rutinosido-5",7",3''',4'''-tetrahydroxy - 6" - dimethylaminomethyl-flavonol-(8")-yl-methyl]-8-dimethylaminomethyl - flavonol of the formula

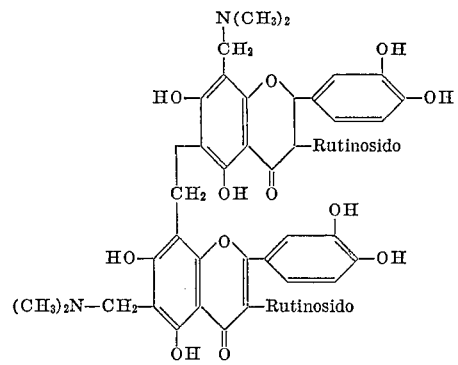

in substantially pure form, and salts thereof.

20. A pharmaceutical composition comprising a minor effective amount of a compound as claimed in claim 9 and a major amount of an inert pharmaceutical carrier.

References Cited

UNITED STATES PATENTS 2,646,428   7/1953   Chabrier et al. _____ 260—210

FOREIGN PATENTS 348,710   10/1960   Switzerland.

LEWIS GOTTS, *Primary Examiner.*

ELBERT L. ROBERTS, *Examiner.*

J. R. BROWN, *Assistant Examiner.*

UNITED STATES PATENT OFFICE
CERTIFICATE OF CORRECTION

Patent No. 3,336,198           August 15, 1967

Johannes Mueller et al.

It is hereby certified that error appears in the above numbered patent requiring correction and that the said Letters Patent should read as corrected below.

Column 1, line 65, for "flavoured" read -- favoured --; column 2, line 36, for "hyrdoxide" read -- hydroxide --; column 3, first formula, the top portion of the formula should appear as shown below instead of as in the patent:

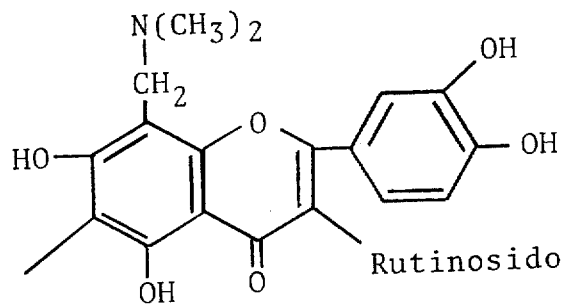

column 4, line 42, for "3-pentylene" read -- 3-aza-pentylene --; column 7, in the formula, the top portion should appear as shown below instead of as in the patent:

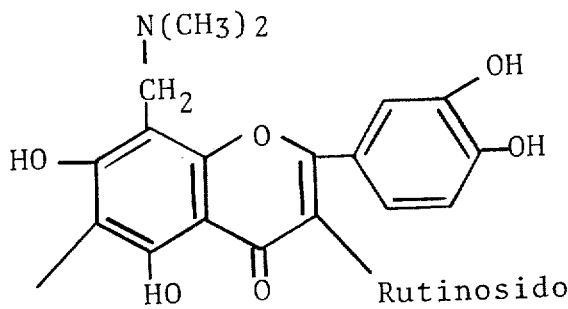

column 8, line 44, for "dimethylaminoethyl-" read -- dimethylaminomethyl- --; column 9, line 69, for "315/b" read -- 316/b --; line 70, for "(1)" read -- (2) --; column 11, line 38, for "445/b" read -- 455/b --; column 14, lines 30 to 36, the right-hand portion of the formula should appear as shown below instead of as in the patent:

3,336,198
(2)

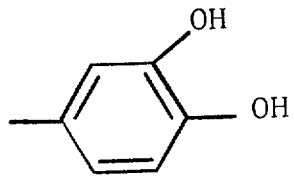

column 20, lines 3 to 9, for that portion of the formula reading

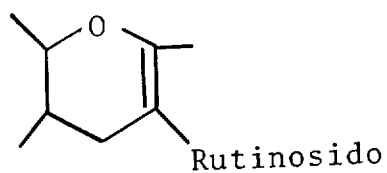   read   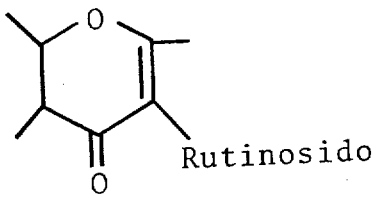

column 22, lines 20 to 27, for that portion of the formula reading

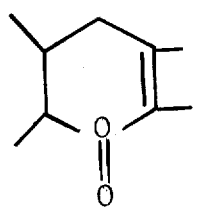   read   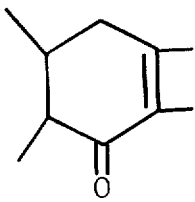

Signed and sealed this 21st day of January 1969.

(SEAL)
Attest:

EDWARD M. FLETCHER, JR.
Attesting Officer

EDWARD J. BRENNER
Commissioner of Patents